United States Patent [19]
Jenkins et al.

[11] Patent Number: 5,926,527
[45] Date of Patent: Jul. 20, 1999

[54] TELEPHONE RELAY SYSTEM

[75] Inventors: Ronald Dean Jenkins, Kingsport, Tenn.; David Eugene Schulz, Wheaton, Ill.

[73] Assignee: AT&T Corp., Middletown, N.J.

[21] Appl. No.: 08/696,549

[22] Filed: Aug. 14, 1996

[51] Int. Cl.$^6$ .................................................. H04M 11/00
[52] U.S. Cl. ...................... 379/93.01; 379/52; 379/90.01
[58] Field of Search .................... 379/52, 90.01, 379/93.01, 93.14, 93.15, 93.17, 93.18, 93.26, 93.27, 100.12, 265

[56] References Cited

U.S. PATENT DOCUMENTS

| | | | |
|---|---|---|---|
| 4,959,855 | 9/1990 | Daudelin | 379/213 |
| 5,163,081 | 11/1992 | Wycherley et al. | 379/52 |
| 5,463,665 | 10/1995 | Millios et al. | 379/52 |
| 5,475,733 | 12/1995 | Eisdorfer et al. | 379/52 |
| 5,521,960 | 5/1996 | Aronow | 379/52 |
| 5,680,443 | 10/1997 | Kasday et al. | 379/52 |

*Primary Examiner*—Stella Woo
*Assistant Examiner*—Melur Ramakrishnaiah

[57] ABSTRACT

The invention provides a telephone relay system for responding to instructions from a first party, or caller. The telephone relay system includes a back-end processor. The back-end processor includes a customer care agent interface, a first party interface, and a controller. The back-end processor allows a customer care agent to go on-hook with respect to the first party and to transfer the call to a controller that sends messages and receives instructions from the first party.

13 Claims, 4 Drawing Sheets

TELEPHONE RELAY SYSTEM

BACKGROUND OF THE INVENTION

1. Field of the Invention

This invention relates to an apparatus and method for a telephone relay system that provides communication between parties.

2. Description of Related Art

Telephone relay systems may provide communication between parties where a first party is using a text terminal such as a teletype or personal computer and a second party is using a voice terminal such as a telephone station. A customer care agent, or communications assistant, may act as an intermediary between the first and second parties.

In such telephone relay systems, the first party begins a telephone relay process by dialing a special number on the text terminal to access the telephone relay system. The first party is then connected to the customer care agent. The customer care agent receives instructions from the first party to make a first call to a second party. When the second party answers, the customer care agent converts the text received from the first party's text terminal into voice for the second party to hear and converts the voice of the second party into text, which is directed to the first party's text terminal for the first party to read. At the end of the first call with the second party, the first party may request a second call to another second party and the same customer care agent makes the second call. This process continues until the first party decides to end the call with the customer care agent.

The first party may be charged only for the cost of the calls made to second parties and not for the customer care agent's services between these calls. Thus, there is a need to reduce the amount of time the customer care agent must spend to support the first party so that the cost of providing telephone relay system services may be reduced.

SUMMARY OF THE INVENTION

The invention provides that, in a telephone relay system with a first party, or caller, using a text terminal such as a teletype or personal computer to communicate with a second party using a voice terminal, a first customer care agent, or communications assistant, can be replaced by an electronic device, or back-end processor, at the end of the communication between the first customer care agent and the first party and/or the second party. The back-end processor takes over the communication in response to a control signal sent by the customer care agent. The back-end processor then sends a message to the first party, receives instructions from the first party in reply to the message, and then responds to the instructions of the first party. In particular, the first party may end the call or initiate a communication to another second party by instructions to the electronic device. The first party may also be connected to a second customer care agent, and the second customer care agent could be different from the first customer care agent who was connected to the calling party.

The telephone relay system can reduce operating expenses for providing such services by automating the end-of-call, or "back-end" steps in a call sequence, i.e., not requiring customer care agent involvement after the end of the communication between the customer care agent and the second party.

The telephone relay system responds to instructions provided by a first party connected to a second party through a customer care agent. The customer care agent disconnects from the call placed by the first party by sending a control signal to the back-end processor. The back-end processor then takes over the call of the first party. The back-end processor sends messages to the first party and responds to instructions provided by the first party by completing the instructed action.

BRIEF DESCRIPTION OF THE DRAWINGS

The invention is described in detail with reference to the following drawings wherein like reference numerals indicate like elements.

DETAILED DESCRIPTION OF PREFERRED EMBODIMENTS

Figure 1:
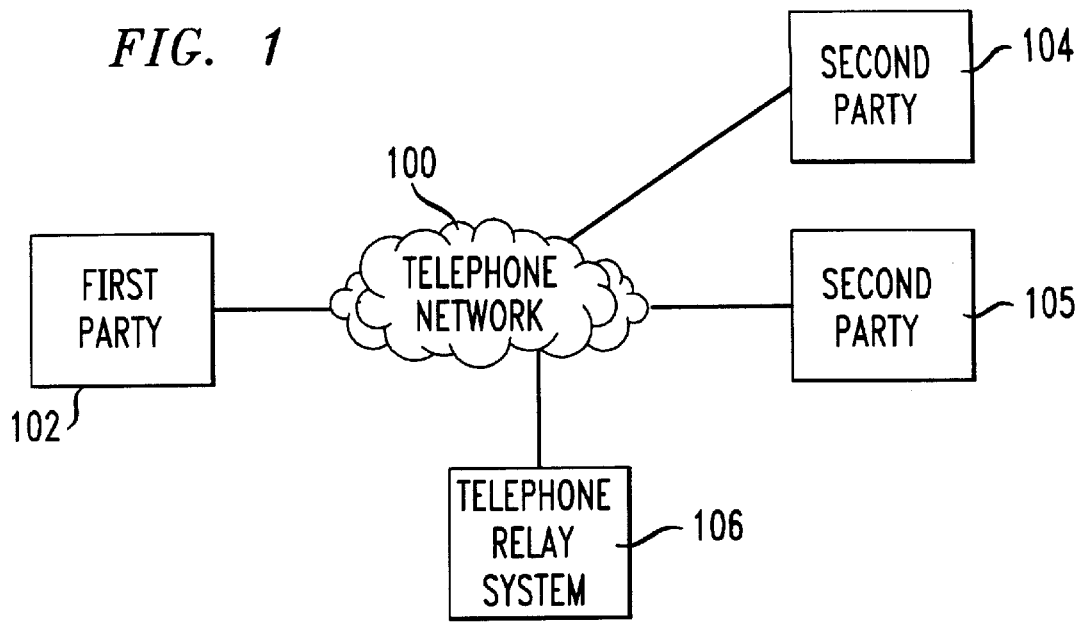
FIG. 1 is a diagram of a telephone network with a telephone relay system.

FIG. 1 shows a telephone network 100, connecting a first party 102, second parties 104 and 105, and a telephone relay system 106. The first party 102 communicates through a text terminal such as a teletype or a personal computer. The first party 102 may communicate with the second party 104 by first calling the telephone relay system 106. The telephone relay system 106 may answer the first party call automatically, and dial the telephone number of the second party 104 after receiving the telephone number and instructions from the first party 102. When the second party 104 answers, a customer care agent, or communications assistant, is connected to the first party 102 and the second party 104. At the end of the call with the second party 104, the first party 102 may direct the customer care agent to place another call to another second party 105.

Figure 2:
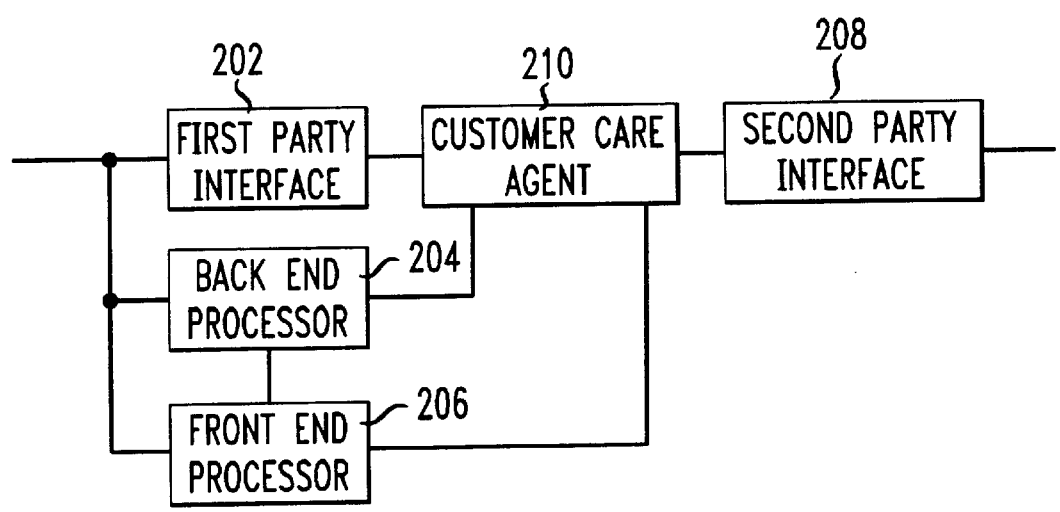
FIG. 2 is a block diagram of the key elements of the telephone relay system.

FIG. 2 shows other elements of the telephone relay system 106. The telephone relay system 106 may include a first party interface 202, a second party interface 208, a customer care agent 210 in communication with the first party 102 and the second parties 104 and 105. The customer care agent 210 may also communicate with a front-end processor 206 and a back-end processor 204. The front-end and back-end processors 206 and 204 interface directly with the first party 102.

The first party 102 may be a special needs person such as a person who is hearing impaired. Thus, the first party 102 may communicate with the customer care agent 210 through a terminal such as a teletype or personal computer. The first party 102 enters information such as words of a conversation through the terminal and the terminal transmits the information to the customer care agent 210 through the first party interface 202.

After receiving the information from the first party interface 202, the customer care agent 210 converts the information to voice and communicates the voice to the second party 104 through the second party interface 208.

When the first party 102 initiates a communication to a second party 104 through the telephone relay system 106, the telephone relay system 106 may initially connect the first party 102 to front-end automation (such as front-end processor 206) or initially to the customer care agent 210. The first party 102 provides the telephone number of a second party that the first party desires to communicate with, such as second party 104, to the front-end processor 206 of the telephone relay system 106. The front-end processor 206 (or the customer care agent 210) dials the telephone number of the second party 104 and connects the first party 102 to a customer care agent 210.

When the first party 102 has completed the communication with the second party 104 (with the customer care agent 210 as an intermediary), the customer care agent 210 goes on-hook and transfers the first party 102 to a back-end processor 204, which takes over the call and sends messages to the first party 102, receives instructions from the first party 102, and responds to instructions from the first party 102.

Figure 3:
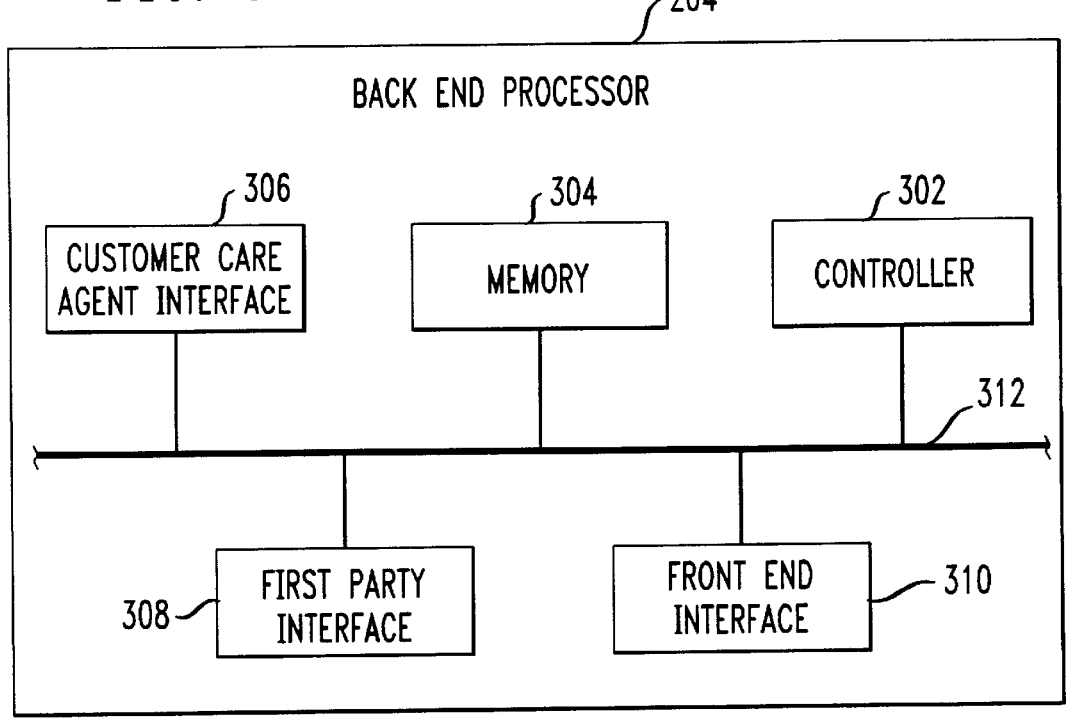
FIG. 3 is a block diagram of the back-end processor.

A block diagram of the back-end processor 204 is shown in FIG. 3. The first party 102 is connected to the back-end processor 204 via first party interface 308 and line 312 and to a customer care agent 210 via a customer care agent interface 306 and line 312. Both the first party interface 308 and the customer care agent interface 306 can include text-based terminals such as teletypes and personal computers. The customer care agent 210 provides any necessary translation functions (e.g., text to voice) between the first party 102 and the second party 104. Thus, the customer care agent 210 is engaged during the call sequence beginning when the second party 104 is connected to the first party 102 and ending when the customer care agent 210 transfers the first party 102 to the back-end processor 204.

When a first party 102 completes a communication with a second party 104, the first party 102 may send a message to the customer care agent 210 through the first party interface 308, signal line 312, and customer care agent interface 306. The customer care agent 210 then directs the controller 302 to take over the call of the first party 102 to the telephone relay system 106. Controller 302 may retrieve messages from memory 304. The controller 302 sends these messages to the first party 102. The messages allow the first party 102 to select one of a series of instructions for controller 302 to execute, including initiating another communication with another second party such as second party 105, and ending the call to the telephone relay system 106. If the first party 102 signals a desire to communicate with another second party, the controller 302 connects the first party 102 to the front-end processor 206, through the front end interface 310. Controller 302 can also directly connect the first party 102 to a customer care agent 210.

FIG. 3 also shows a memory 304 for storing pre-recorded messages to be sent to the first party 102 in response to a control signal from controller 302 via line 312. When the operator 210 transfers the call of the first party 102 to the back-end processor 204, the controller 302 signals the memory 304 to send the pre-recorded messages to the first party 102 via line 312 and first party interface 308. The controller 302 receives the text reply of the first party 102 via first party interface 308 and line 312 and either 1) transfers the call to the front end processor 206 via line 312 and front-end interface 310 so that another call can begin; 2) ends the call; or 3) returns the first party 102 to a customer care agent 210 via first party interface 308, line 312, and operator interface 306, depending on the text reply of the first party 102.

Figure 4:
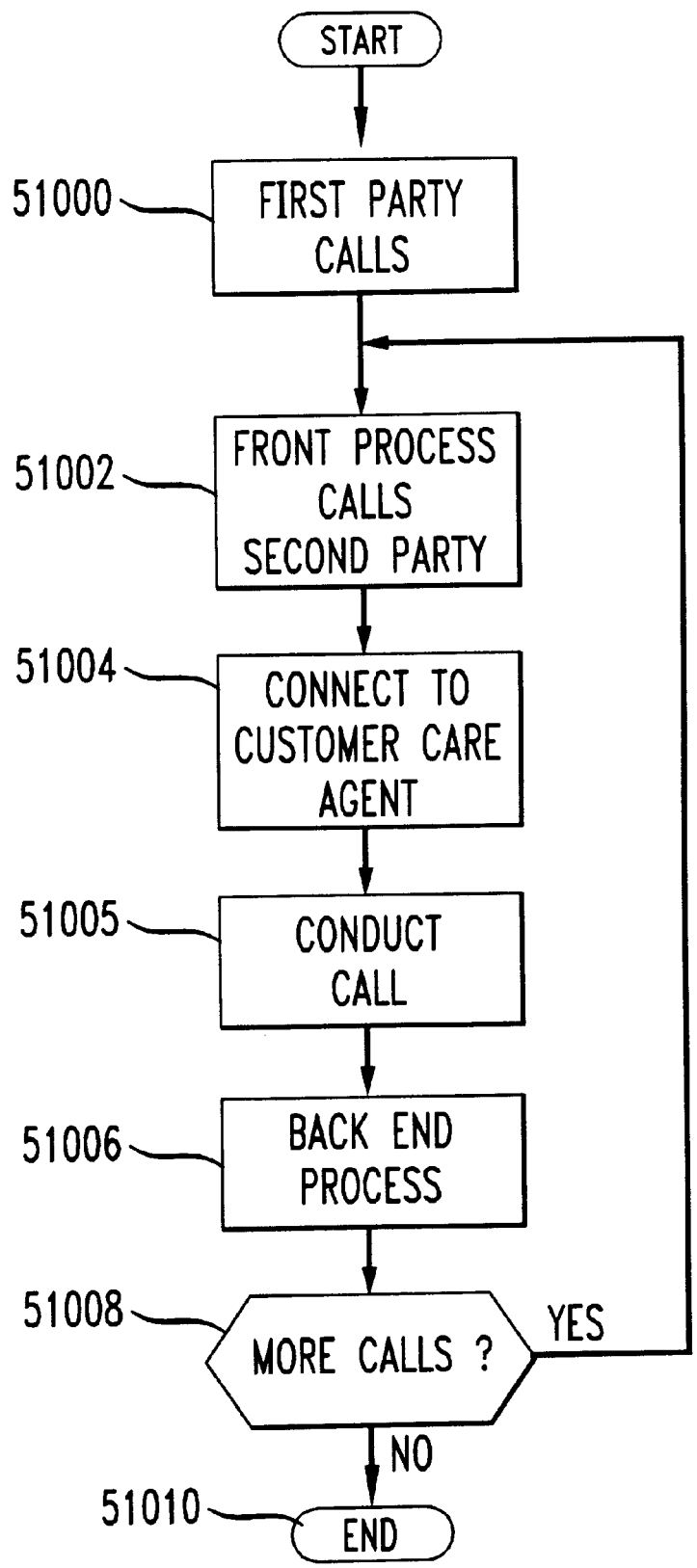
FIG. 4 is a flowchart illustrating a process for placing a call with the telephone relay system.

FIG. 4 shows the steps involved in a call sequence. In step S1000, the first party 102 calls the telephone relay system 106. In step S1002, the customer care agent 210 or front-end processor 206 receives instructions from the first party 102 regarding the second party to be called. If the first party 102 desires to call a second party such as second party 104, the front-end processor 206 receives the telephone number of the second party 104 and dials the number. In step S1004, the first party 102 is transferred from the front-end processor 206 to the customer care agent 210. In step S1005, the first party 102 communicates with the second party 104 through the customer care agent 210. When the first and second parties 102 and 104 complete their communication, the process goes to step S1006.

In step S1006, the customer care agent 210 goes on-hook and connects the first party 102 to the back-end processor 204. The first party 102 decides whether to communicate with another second party such as second party 105, for example. In step S1008, if the first party 102 decides to call another second party 105, the process returns to step S1002. If the first party 102 wishes to end the call, the process goes to step S1010 and the telephone relay system 106 goes on-hook with respect to the first party 102.

Figure 5:
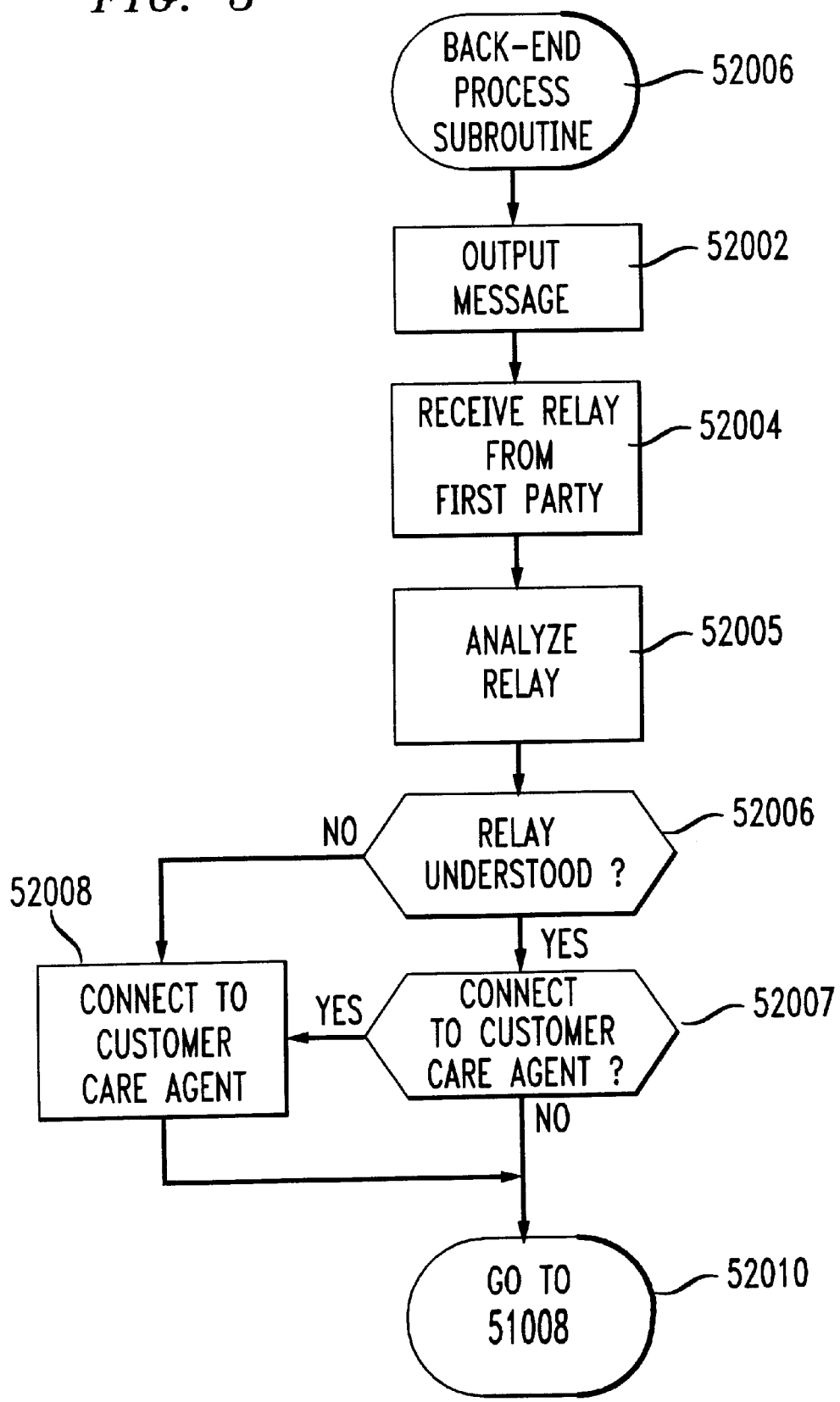
FIG. 5 is a flowchart of the back-end process.

Step S1006 is shown in more detail in FIG. 5. In step S2002, the controller 302 queries the first party 102 whether to: 1) place another call; 2) end the call; or 3) return to the customer care agent 210. Then the controller 302 goes to step S2004. In step S2004, the controller 302 receives a reply from the first party 102. Then the controller 302 goes to step S2005. In step S2005, the controller 302 analyzes the reply from the first party 102 and goes to step S2006.

In step S2006, if the reply from the first party 102 cannot be understood, the controller 302 goes to step S2008. Otherwise, the controller 302 goes to step S2007. If the instruction from the first party is to connect to the customer care agent 210, the controller 302 goes to step S2008. Otherwise, the controller 302 goes to step S2010, which returns to step S1008 of FIG. 4. In step S2008, the controller 302 transfers the first party 102 to the customer care agent 210. In step S2008, the customer care agent 210 to whom the first party 102 is connected may be a different customer care agent 210 than was originally connected to the first party 102.

The telephone relay system 106 of the invention offers distinct advantages over current practices. In particular, the telephone relay system can reduce operating expenses associated with having customer care agent 210 engaged in unnecessary tasks that are handled with the invention by a processor or electronic device.

While this invention has been described in conjunction with specific embodiments thereof, it is evident that many alternatives, modifications and variations will be apparent to those skilled in the art. For example, a message sent by the controller could include additional choices beyond the three mentioned above. Accordingly, preferred embodiments of the invention as set forth herein are intended to be illustrative, not limiting. Various changes can be made without departing from the spirit and scope of the invention as defined in the following claims.

What is claimed is:

1. A telephone relay system that includes a first party connected to a second party in a call through a customer care agent, the telephone relay system comprising:

a back-end processor, wherein after receiving a control signal from the customer care agent after the call is terminated, the back-end processor responds to an instruction received from the first party, by performing an instructed action.

2. The telephone relay system of claim 1, wherein the back-end processor comprises:

a customer care agent interface;

a first party interface; and a controller coupled to the customer care agent interface and the first party interface, wherein when the controller receives the control signal from the customer care agent through the customer care agent interface, the controller disconnects the customer care agent from the first party.

3. The telephone relay system of claim 1, wherein the back-end processor sends a message to the first party after receiving the control signal from the customer care agent, the first party responding to the message by sending the instruction to the back-end processor.

4. The telephone relay system of claim 1, further comprising:

a memory connected to the controller for storing pre-recorded messages, wherein the controller outputs one of the pre-recorded messages to the first party after receiving the control signal to prompt the first party for the instruction.

5. The telephone relay system of claim 1, wherein the controller analyzes the instruction received from the first party, and if the controller fails to understand the instruction, then the controller connects the first party to a customer care agent.

6. The telephone relay system of claim 1, wherein the instructed action comprises one of going on-hook with respect to the first party, transferring the first party to a front-end device for calling another second party, and transferring the first party to the customer care agent.

7. A method for operating a telephone relay system that includes a first party connected to a second party in a call through a customer care agent, the method comprising:

receiving a control signal from the customer care agent after the call is terminated with a back-end processor; then responding to an instruction received from the first party; and performing an instructed action in response to the instruction from the first party.

8. The method of claim 7, further comprising:

sending a message to the first party from the back-end processor after receiving a control signal from the customer care agent.

9. The method of claim 7, wherein the instructed action comprises going on hook with respect to the first party, connecting the first party to a front-end processor, and connecting the first party to the customer care agent.

10. The method of claim 7 further comprising disconnecting the customer care agent from the first party with a controller when the controller receives the control signal from the customer care agent.

11. The method of claim 7, further comprising:

storing a plurality of pre-recorded messages in a memory connected to the controller; and the controller outputting one of the pre-recorded messages to the first party after receiving the control signal from the customer care agent.

12. The method of claim 7, further comprising:

analyzing the instructions received by the controller from the first party, wherein if the controller fails to understand the instructions, then the controller connects the first party to a customer care agent.

13. The method of claim 7, further comprising:

sending one of a plurality of messages to the first party from the back-end processor after receiving the control signal from the customer care agent.

* * * * *